(12) United States Patent
Webb et al.

(10) Patent No.: US 9,188,358 B2
(45) Date of Patent: Nov. 17, 2015

(54) CONTROL SYSTEM AND METHOD FOR HEATING AND COOLING DEVICES

(76) Inventors: Clive Alan Webb, Hamilton, CA (US); Yvette Rose Webb, Hamilton, CA (US)

( * ) Notice: Subject to any disclaimer, the term of this patent is extended or adjusted under 35 U.S.C. 154(b) by 59 days.

(21) Appl. No.: 13/616,780

(22) Filed: Sep. 14, 2012

(65) Prior Publication Data

US 2013/0015252 A1 Jan. 17, 2013

Related U.S. Application Data

(63) Continuation of application No. 11/655,235, filed on Jan. 19, 2007, now Pat. No. 8,292,191.

(60) Provisional application No. 60/759,752, filed on Jan. 19, 2006.

(51) Int. Cl.
*G05D 23/19* (2006.01)
*F24F 11/00* (2006.01)

(52) U.S. Cl.
CPC .......... *F24F 11/006* (2013.01); *G05D 23/1934* (2013.01)

(58) Field of Classification Search
CPC .......................... F24F 11/006; G05D 23/1934
USPC .............. 236/1 C, 91 D, 46 C; 165/201, 254; 62/203; 700/276, 277
See application file for complete search history.

(56) References Cited

U.S. PATENT DOCUMENTS 5,860,473 A * 1/1999 Seiden ........................ 165/208

* cited by examiner

*Primary Examiner* — Travis Ruby
(74) *Attorney, Agent, or Firm* — Brian J. Teague

(57) ABSTRACT

A device and method for managing the supply of energy to heating and cooling devices based on environmental conditions within a regulated area, said system including one or more sensor devices within said regulated area for communicating one or more status signals, and a control module for receiving said one or more status signals, said control module analyzing said one or more status signals based on one or more heating and cooling routines, said one or more heating and cooling routines instructing said control module to communicate one or more control signals to said heating and cooling devices, said one or more control signals activating or deactivating said heating and cooling devices.

8 Claims, 6 Drawing Sheets

FIGURE 3

| LED COLOR | LED MODE | SENSOR DEVICE STATUS | CONTROL MODULE STATUS | HEATING AND COOLING DEVICE STATUS |
|---|---|---|---|---|
| RED (HEATING FUNCTION) | CONSTANT | ON | ON | ON |
| | INTERMITTENT | ON | BLOCKED | OFF |
| GREEN (COOLING FUNCTION | CONSTANT | ON | ON | ON |
| | INTERMITTENT | ON | BLOCKED | OFF |
| YELLOW | CONSTANT | CONTROL MODULE ENGAGED (BYPASS SWITCHES ENGAGE) | | |
| | INTERMITTENT | CONTROL MODULE DISENGAGED (BYPASS SWITCHES DISENGAGED) | | |

FIGURE 4

SERIES OF HEATING ROUTINES

| Routines | \multicolumn{16}{c}{TIME INTERVAL (in minutes)} |
|---|---|

| Routines | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| H-0 | ⊖ | O | O | O | O | O | O | O | ⊖ | O | O | O | O | O | O | O |
| H-1 | ⊖ | O | O | O | O | O | O | O | ⊖ | O | O | O | O | O | O | O |
| H-2 | ⊖ | O | O | O | O | O | O | O | ⊖ | O | O | O | O | O | O | O |
| H-3 | ⊖ | ⊖ | O | O | O | O | O | O | ⊖ | ⊖ | O | O | O | O | O | O |
| H-4 | ⊖ | ⊖ | O | O | O | O | O | O | ⊖ | ⊖ | O | O | O | O | O | O |
| H-5 | ⊖ | ⊖ | ⊖ | O | O | O | O | O | O | O | O | O | O | ⊖ | ⊖ | ⊖ |
| H-6 | ⊖ | ⊖ | ⊖ | O | O | O | O | O | O | O | O | O | ⊖ | ⊖ | ⊖ | O |
| H-7 | ⊖ | ⊖ | ⊖ | O | O | O | O | O | O | O | O | ⊖ | ⊖ | ⊖ | O | O |
| H-8 | ⊖ | ⊖ | ⊖ | O | O | O | O | O | O | O | ⊖ | ⊖ | ⊖ | O | O | O |
| H-9 | ⊖ | ⊖ | ⊖ | O | O | O | O | O | O | ⊖ | ⊖ | ⊖ | O | O | O | O |
| H-A | ⊖ | ⊖ | ⊖ | O | O | O | O | O | ⊖ | ⊖ | ⊖ | O | O | O | O | O |
| H-B | ⊖ | ⊖ | ⊖ | O | O | O | O | ⊖ | ⊖ | ⊖ | O | O | O | O | ⊖ | ⊖ |
| H-C | ⊖ | ⊖ | ⊖ | O | O | O | ⊖ | ⊖ | ⊖ | O | O | ⊖ | ⊖ | ⊖ | ⊖ | O |
| H-D | ⊖ | ⊖ | ⊖ | O | O | ⊖ | ⊖ | ⊖ | O | O | ⊖ | ⊖ | ⊖ | O | O | ⊖ |
| H-E | ⊖ | ⊖ | ⊖ | O | ⊖ | ⊖ | ⊖ | O | ⊖ | ⊖ | ⊖ | O | ⊖ | ⊖ | ⊖ | O |
| H-F | ⊖ | ⊖ | ⊖ | ⊖ | ⊖ | ⊖ | ⊖ | O | ⊖ | ⊖ | ⊖ | ⊖ | ⊖ | ⊖ | ⊖ | O |

FIGURE 5

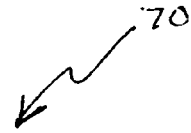

SERIES OF COOLING ROUTINES

| Routines | TIME INTERVAL (in minutes) | | | | | | | | | | | | | | | |
|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| C-0 | O | O | O | θ | θ | θ | θ | θ | θ | θ | θ | O | O | O | O | O |
| C-1 | O | O | O | θ | θ | θ | θ | θ | θ | θ | θ | O | O | O | O | O |
| C-2 | O | O | O | θ | θ | θ | θ | θ | θ | θ | θ | O | O | O | O | O |
| C-3 | O | O | O | θ | θ | θ | θ | θ | θ | θ | θ | O | O | O | O | O |
| C-4 | O | O | O | θ | θ | θ | θ | θ | θ | θ | θ | O | O | O | O | O |
| C-5 | O | O | O | θ | θ | θ | θ | θ | θ | θ | θ | O | O | O | O | O |
| C-6 | O | O | O | θ | θ | θ | θ | θ | θ | θ | θ | θ | O | O | O | O |
| C-7 | O | O | O | θ | θ | θ | θ | θ | θ | θ | θ | θ | θ | O | O | O |
| C-8 | O | O | O | O | θ | θ | θ | θ | θ | θ | θ | θ | θ | θ | O | O |
| C-9 | O | O | O | O | θ | θ | θ | θ | θ | θ | θ | θ | θ | θ | θ | θ |
| C-A | O | O | O | O | θ | θ | θ | θ | θ | θ | θ | θ | θ | θ | θ | θ |
| C-B | O | O | O | O | θ | θ | θ | θ | θ | θ | θ | θ | θ | θ | θ | θ |
| C-C | O | O | O | O | θ | θ | θ | θ | θ | θ | θ | θ | θ | θ | θ | θ |
| C-D | O | O | O | O | θ | θ | θ | θ | θ | θ | θ | θ | θ | θ | θ | θ |
| C-E | O | O | O | O | θ | θ | θ | θ | θ | θ | θ | θ | θ | θ | θ | θ |
| C-F | O | O | O | O | θ | θ | θ | θ | θ | θ | θ | θ | θ | θ | θ | θ |

CONTROL SYSTEM AND METHOD FOR HEATING AND COOLING DEVICES

FIELD OF THE INVENTION

The present invention relates to a control system and method for managing the consumption of energy within a regulated area, and more particularly to a control system and method for efficiently managing the supply of energy to heating and cooling equipment based on environmental conditions within a regulated area.

BACKGROUND OF THE INVENTION

It is well known in the field of building temperature control that the simple turning on and off of heating or cooling systems in response to requests from thermostats and other sensor devices wastes energy and causes marked fluctuations in temperatures within temperature regulated areas, such as commercial, industrial and residential buildings. During a heating or cooling cycle, these temperature fluctuations can cause discomfort to the occupants within the temperature regulated areas. Commonly, this is due to the sizing of the heating and cooling equipment to meet the demands of extreme conditions, either of heat or cold. During high demand conditions, that is extreme heat or cold, systems designed to satisfy these conditions operate in relatively efficient operating modes, with infrequent off times. Therefore there is an approximate matching of sizing of equipment to the demand with consequent infrequent off times. However, as environmental conditions become less extreme, the same equipment has a tendency to overwhelm the reduced demand, remaining on to long and heating or cooling the temperature regulated area excessively. This phenomenon is known as "overshoot" and can result in significant variances, or "flux", in temperature in the regulated areas from the temperature set on the thermostat. This, in turn, wastes energy and causes discomfort to individuals within the temperature regulated areas.

Many computerized systems and methods have been devised to reduce the occurrence of overshoot. For example, U.S. Pat. No. 4,509,585 describes a system in which a series of static on and off sequences, lasting for example eighteen minutes, are selected and applied successively depending upon the heating and cooling demand within the regulated area. One difficulty of such systems is that they do not respond to off-hour settings when the programmed thermostat or sensor device drops the demand equipment to save energy, such as when a building is closed to personnel. This computerized system is also unable to automatically change over from heating to cooling functions or vice versa. Therefore, this system cannot adapted to fluctuations in the environmental conditions in a regulated area from heating to cooling functions that can occur in a same day.

Accordingly, the present invention provides a system and method for efficiently managing the supply of energy to heating and cooling devices based on temperature conditions within a regulated area that can be utilized with existing sensor devices within a commercial, industrial or residential building. The present invention further provides a system and method for automatically adapting to the real time environmental conditions within a regulated area by optimally determining the program or routine for efficiently supplying energy to the heating and cooling devices. The present invention also provides for a system and method of monitoring and recording the operation of the heating and cooling devices and sensor devices in order to optimize the efficient supply of energy to the heating and cooling devices.

SUMMARY OF THE INVENTION

In a first aspect, the present invention relates to a system for managing the supply of energy to heating and cooling devices based on environmental conditions within a regulated area, said system including one or more sensor devices within said regulated area for communicating one or more status signals, and a control module for receiving said one or more status signals, said control module analyzing said one or more status signals based on one or more heating and cooling routines, said one or more heating and cooling routines instructing said control module to communicate one or more control signals to said heating and cooling devices, said one or more control signals activating or deactivating said heating and cooling devices.

In a second aspect, the present invention relates to a method for managing the supply of energy to one or more heating and cooling devices based on environmental conditions within a regulated area, said method including the steps of receiving one or more status signals from one or more sensor devices, selecting one or more heating and cooling routines based on said one or more status signals, said heating and cooling routines having one or more control signal entries, generating one or more control signals to activate or deactivate said one or more heating and cooling devices based on said one or more control signal entries.

BRIEF DESCRIPTION OF THE DRAWINGS

For a better understanding of the present invention, and to show more clearly how it may be carried into effect, reference will now be made, by way of example, to the accompanying drawings which show preferred embodiments of the present invention, and in which:

FIG. 3 is a table illustrating exemplary visuals displays provided by the LED module of the control module shown in FIG. 2;

FIG. 4 is a schematic diagram of exemplary heating routines for activating and deactivating the one or more heating and cooling devices in accordance with an embodiment of the present invention;

FIG. 5 is a schematic diagram of exemplary cooling routines for activating and deactivating the one or more heating and cooling devices in accordance with an embodiment of the present invention.

BRIEF DESCRIPTION OF THE INVENTION

Reference is made to FIGS. 1-6 which illustrate a control system and method for efficiently managing the supply of energy to heating and cooling devices based on environmental conditions within a regulated area in accordance with a preferred embodiment of the present invention, and shown generally as numeral 10.

Figure 1:
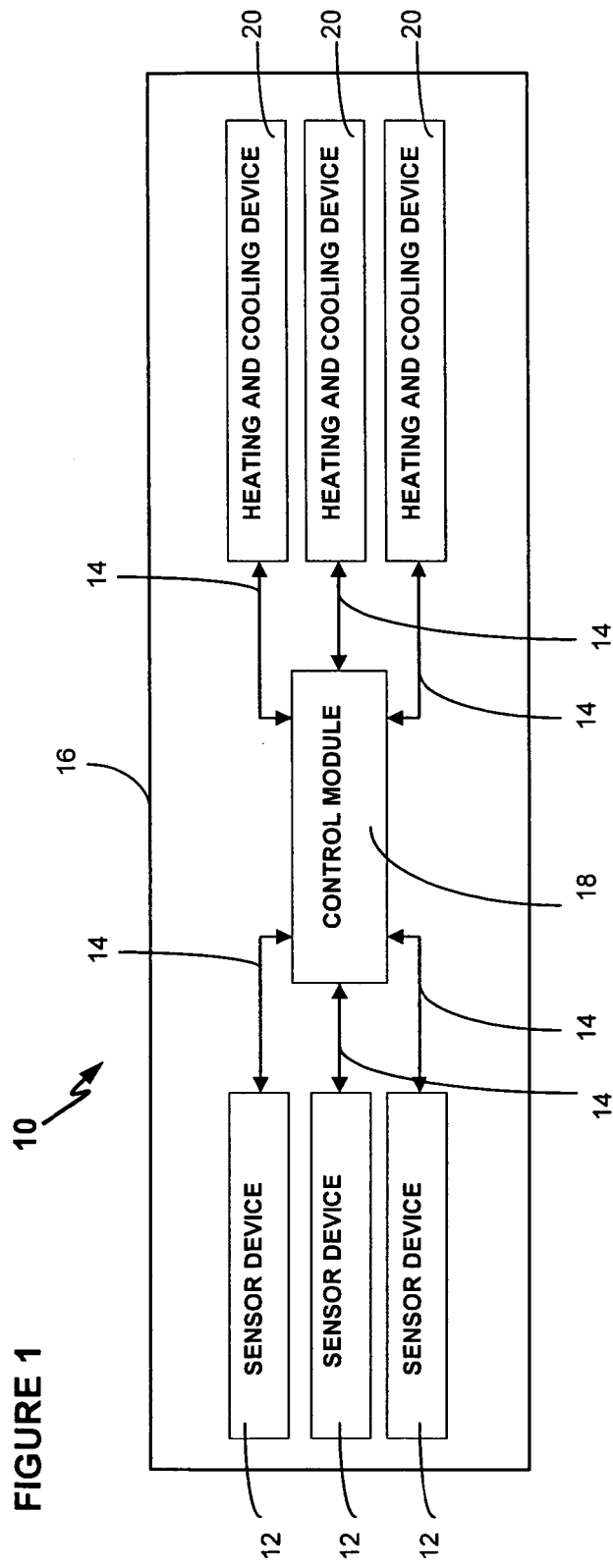
FIG. 1 is a schematic diagram which illustrates out of no preferred embodiment of the control unit.

Referring to FIG. 1, an embodiment of a system for managing the efficient supply of energy to one or more heating and cooling devices is shown generally as control system 10. Control system 10 comprises one or more sensor devices 12 positioned within a regulated area 14 which are adapted for communicating one or more status signals 16 to a control module 18. The control module 18 is positioned between the one or more sensor devices 12 and the one or more heating and cooling devices 20 to control the activation and deactivation of said heating and cooling devices 20. The one or more status signals 16 provide the control module 18 with data concerning the environmental conditions within the regulated area 14 and any other data utilized by the control system 10. The one or more sensor devices 12 may include thermostats, humidity sensors and/or any suitable sensor devices which are capable of determining the environmental conditions within the regulated area 14 and communicating one or more status signals 16 to the control module 18. The sensor devices 12 may also include thermostats provided within the heating and cooling devices 20, shown as numeral 19 in FIG. 2.

Referring again to FIGS. 1 and 2, the one or more heating and cooling devices 20 are adapted to provide heating and/or cooling functions within the regulated area 14 upon receiving one or more control signals 22 from the control module 18. The status signals 16 from the one or more sensor devices 12 are analyzed and recorded by the control module 18. In response to the one or more status signals 16, the control module 18 will communicate the one or more control signals 22 to the heating and cooling devices 20 associated with or within the control module 18 itself. The control signals 22 can be designed to activate (i.e. turn "on") or deactivate (i.e. turn "off") the heating and cooling devices 20 in accordance with a series of predefined or user defined heating and/or cooling routines programmed into the control module 18. In some embodiments of the present invention, the status and control signals 16, 22 may be communicated from and to each of the sensor devices 12, the control module 18, and/or the heating and cooling devices 20 via private intranet, the publicly accessible internet, power lines, telephone lines, Ethernet connections, ISDN lines, optical data-transport links, wireless data links, wireless cellular links anchor any suitable communication means known or hereafter developed.

Figure 2:
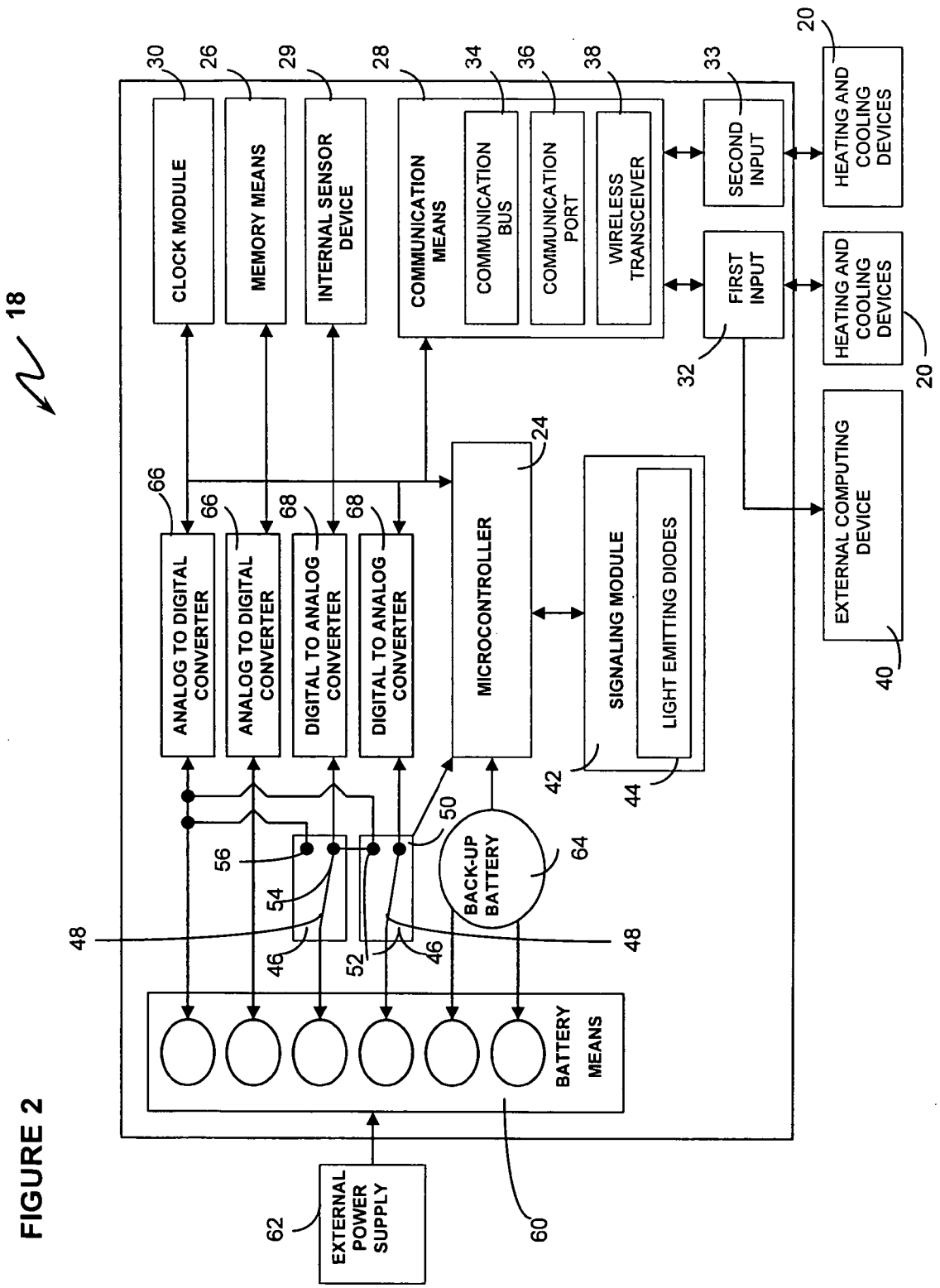
FIG. 2 is a schematic diagram illustrating an exemplary embodiment of the control module shown in FIG. 1.

Referring to FIG. 2, shown is a detailed schematic diagram of the control module 18 through which data may be received as input status signals 16 from the one or more sensor devices 12 and provided as output control signals 22 for managing the supply of energy to the heating and cooling devices 20 in accordance with one very specific embodiment of the invention. The control module 18 consists of a set of integrated components and includes a PIC microcontroller 24, a memory means 26, a communication means 28, and a dock module 30. The microcontroller 24 and memory means 26 are adapted to which contain the instructions, routines and algorithm that initiate the communication of the control signals 22 to the heating and cooling devices 20 at a first output 32 and a second output 33. The memory means 26 is adapted for receiving and recording data, such as, for example, information pertaining to the status signals, control signals, environmental conditions, energy efficiency of the control system 10 and historical information.

The memory means 26 may be any suitable discrete memory device, such as flash memory, residing in whole or in part in the microcontroller 24. While the microcontroller 24 and memory means 28 are shown as discrete components, it should be appreciated that both components may be distributed amongst various components of the control module 18 acting in concert.

The communication means 28 is adapted to communicate with the sensor devices 12 and/or the heating and cooling devices 20 via the first output 32 and the second output 33 provided in the control module 18. The first output 32 can be adapted to communicate the control signals 22 relating to the heating of the regulated area 14 to the heating and cooling devices 20. Similarly, the second output 33 can be adapted to communicate the control signals 22 relating to the cooling of the regulated areas 14 to the heating and cooling devices 20. The frequency and duration of these control signals 22 are determined based upon the environmental conditions within the regulated area 14, and particularly the frequency of the one or more status signals 16 from the sensor devices 12. The frequency and duration of the control signals 22 can also depend upon the particular routine initiated by the control module 18 to respond to the environmental conditions in the regulated area 14. The control module 18 analyzes and records each of the one or more status signals 16 from the one or more sensor devices 12 in order to optimize the performance of the control system 10, and to select the most efficient heating or cooling routine to address the existing environmental conditions in the regulated area 14.

Continuing to refer to FIG. 2, the communication means 28 may also receive and transmit the status signals 16 and control signals 22 via a wireless network (not shown). Each of the one or more sensors devices 12 situated throughout the regulated area 14 are provided with a unique address to enable the microcontroller 24 of the control module 18 to identify and pole the sensor devices 12 to receive the data (including the status signals 16) relating to the environmental conditions in the vicinity of the subject sensor device 12. In the embodiment of the present invention shown in FIG. 2, the communication means 28 includes a communication bus 34, a communication port 36 and a wireless transceiver 36. The communication bus 34 and port 36 may be any suitable communication devices known or hereafter developed, such as, for example, the RS 465 communications bus 10 and the RS232 port 11, respectively.

The communications means 28 may also be adapted to receive and transmit data to and from sensors devices 12, control module 18 and/or the heating and cooling devices 20 and an external computing device 40 operated by repair personnel, utilities personnel, building management or any other interested user desirous of monitoring the performance of the control system 10. The users may also monitor the energy savings that have been realized as a result of the use of the control system 10. It should be understood that the control system 10 may communicate with any suitable external computing device 40, such as, for example, personal digital assistants (PDAs), cellular telephones, pagers, portable electronic mail messaging or other messaging devices, handheld organizers, portable computing devices or other suitable electronic devices.

Moreover, it should be understood that the data received and transmitted by communication means 28 can be in any form, such as text, electronic mail, messages, pages, video sounds or images, Preferably, the data is text-based for quick transmission including HTML or XML based documents, for example, but it may be in any other suitable formats.

Referring to FIG. 2, the clock module 30 is a representation of the "real time" of the operation of the control module 18. The real time of the control module 18 may be determined using various Internet based services, such as, for example, the United States National Institute of Standards and Technology Clock or the World Time Server Clock. Time is calculated by the control module 18 by referring to the clock module 30. The clock module 30 may be utilized to "date stamp" the data received for the various sensor devices 12, heating and cooling devices 20 and external computing devices 40 pertaining the status signals 16, control signals 22, environmental conditions, energy efficiency of the control system 10 and historical information, for example. The clock module 30 is also important for various time dependent functions of the control module 18, such as, for example the activation or deactivation of the heating and cooling devices 20 in accordance with the selected routine, as will be discussed in greater detail below.

Based on the environmental conditions within the regulated area 14, the control module 18 will communicate data, including one or more status signals 16 and control signals 22, to and from the various sensor devices 12, heating and cooling devices 20, and external computing devices 40. Each of the status signals 16, control signals 22 and/or other data for managing the heating and cooling functions of the control module 18 is date stamped by the clock module 30 and stored in the memory means 26. The data may be stored in the memory means 26 on a first-in, first-out basis to conserve memory space. This information may then be transmitted by the communication means 28 to the external computing devices 40 in real time or in response to a scheduled command or request from the user. This reported information can be utilized by a user to monitor the performance of the control system 10, produce energy saving reports and optimize the algorithms, instructions and routines used by the microcontroller 24. Since one of the purposes of the control system 10 is to provide a simplified and inexpensive means for efficiently managing the supply of energy to the heating and cooling devices 20, in preferred embodiments of the present invention, the data recorded by the control module 18 is transmitted to an external memory device (such as the external computing means 40) to be analyzed and optimized by the user. Using the transmitted data, the user may reprogram the algorithms, instructions and routines, and communicate the new routines to the control module 18, via communication means 28, for implementation and initiation by the microcontroller 24 and memory means 26 during the next suitable heating or cooling routine.

In a further embodiment of the present invention shown in FIGS. 2 and 3, the control module 18 further includes a signaling module 42 having one or more light emitting diode devices 44 which are adapted to provide visual displays to indicate the current status of the control system 10 based on the control signals 22 from the microcontroller 24. Referring to FIG. 3, the signaling module 42 may be adapted to provide visual displays consisting of various colors or modes, such as, for example, intermittent or constant visual displays. Referring to FIG. 3, shown is an exemplary description of the display signals generated by the signaling module 42 and the microcontroller 24 to report the real-time status of the control module 18. For example, when the light emitting diode devices 44 are red and flashing, it provides notification to the user that the one or more of the sensor devices 12 are communicating a status signal 16 to activate the heating function of the heating cooling devices 20. However, the control module 18 is blocking the status signal 16 from activating the heating and cooling devices by not communicating a corresponding control signal 22. The control module 18 may have blocked the activation of the heating and cooling devices 20 in accordance with the routine being simultaneously operated by the microcontroller 24, for example. Alternatively, the control module 18 may block the status signals 16 if the supply of energy to the heating and cooling devices 20 would be inefficient.

Referring to FIG. 2, there are circumstances where the control module 18 should be taken off-line allowing the status signals 16 from the one or more sensor devices 12 to directly control the heating and cooling devices 20. For example, in the event of a power failure, the control module 18 can be manually disconnected by actuating one or more bypass switches 46 shown in FIG. 2. The bypass switches 46 may be any suitable electro-mechanical or solid state switch known in the heating and cooling art. It can be seen that when one or more poles 48 associated with the bypass switches 46 are disengaged, as first pole 60 will connect with a second pole 52, and a third pole 54 will connect with a fourth pole 56. Simultaneously, the first pole 50 will disconnect from the third pole 54, thereby directly connecting the one or more sensor devices 12 directly to the corresponding one or more heating and cooling devices 20. By this design, the one or more sensor devices 12 will communicate the status signals 16 directly to the one or more heating and cooling devices 20, and the energy savings resulting from the use of the control system 10 will be lost until the first and third poles 50 and 54 are reengaged.

In an embodiment of the present invention, the user may engage and disengage the bypass switches 46 remotely using the external computing device 40 which communicates with the control module 18 via the communication means 28 and the microcontroller 24. By this design, the user may engage or disengage the control module 18 to test and monitor the performance of the sensor devices 12 and/or the heating and cooling devices 20 in the regulated area 14 without the control signals 22 from the control module 18. This will enable the user to obtain an energy supply baseline for determining the efficiency benefits of the control module 18 or for optimizing the algorithms, instructions and routines that analyze and generate the status and control signals 18, 22, respectively.

As shown in FIG. 2, the control module 18 is provided with a battery means 60 for receiving an external power supply 62, such as a 24V AC/DC, and converting the power supply 62 to suitable voltage for operating the components of the control module 18, including the microcontroller 24, memory means 26, communication means 28 and clock module 30. Preferably the battery means 60 is capable of converting the power supply 62 from 24 volts to 3-5 volts DC, which commonly the voltage required to operate the microcontroller 24 and the other components of the control module 18. The battery means 60 may also be provided with an internal back-up battery 64 for maintaining the operability of the control module 18 in the event of an interruption to the external power supply 62.

As further shown in FIG. 2, control module 18 also includes analogue to digital converter 66 and a digital to analogy converter 68. It should be appreciated that any known or hereafter developed converters 66, 68 may be used as interface conditioners, filters and/or converters in the control module 18 to convert the various voltages and modes of the status and control signals 16, 22 received and transmitted by the control module 18.

Figure 6:
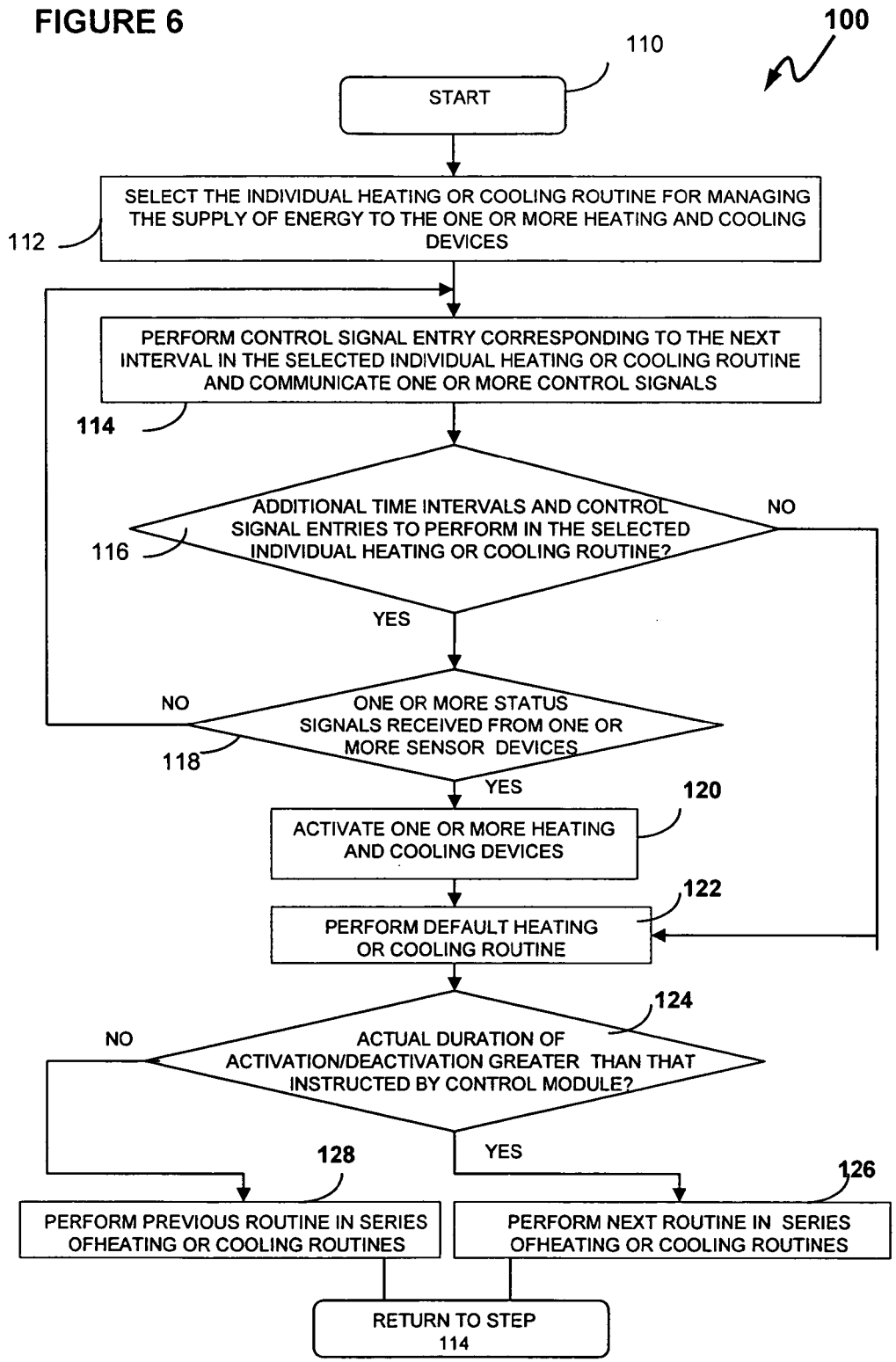
FIG. 6 is a flowchart illustrating the steps to be performed in managing the supply of energy to heating and cooling devices based on temperature conditions within a regulated area in an embodiment of the present invention.

Reference is now made to FIG. 6 in which the steps in an embodiment of a method for efficiently managing the supply of energy to heating and cooling devices 20 based on environmental conditions within a regulated area 14 are shown generally as 100, and commence at step 110. At step 112, the control module 18 programs and selects one or more routines from a set of routines for efficiently supplying energy to the heating and cooling devices 20 for the activation or deactivation thereof. Referring to FIG. 4, shown is an exemplary embodiment of a set of heating routines 70 utilized by the microcontroller 24 of the control module 18 to activate and deactivate the heating and cooling devices 20 based on the environmental conditions within the regulated area 14, the one or more status signals 16, and the one or more control signals 22. The set of heating routines 70 in the exemplary embodiment of the present invention comprises of sixteen individual routines 72 (0 through 9, A through F) shown in horizontal rows in FIG. 4, each consisting of sixteen time intervals 74. Each of the routines 72 have a combination of "on" and "off" control signal entries 76 which instruct the control module 18 to communicate on or more control signals 22 to activate or deactivate, respectively, the heating and cooling devices 20. For the purpose of illustration, the "on" control signal entries 22 are identified as "⊖", and the "off" control signal entries 22 are identified as "O".

Once the programmed individual routine 72 has been selected at step 112, the method proceeds to step 114. At step 114, the method performs the first interval 74 of the chosen routine 72. For example referring to the first heating routine 72 in FIG. 4, referenced as "H-O", the "on" control signal entry 76 programmed by the control system 10 at the first time interval 74 instructs the control module 18 to communicate one or more control signals 22 to activate the heating and cooling devices 20. The heating and cooling devices 20 are activated throughout the first time interval 74. If there are further intervals 74 to be performed by the control system 10 at step 116, further one Of more control signals 22 are communicated by the control module 18 at the commencement of the next time interval 74 to deactivate the heating and cooling devices 20. However, if one or more status signals 22 are received from the sensor devices 12 by the control module 18 requiring the activation of the heating and cooling devices 20 at step 118, the method communicates one or more control signals 22 to the heating and cooling devices 20 at step 120. If no status signals 16 are received by the control module 18 from the one or more sensor devices 12, the method returns to step 116 where it is determine whether there is a further time interval 74 in the routine 72 to be performed.

Following the completion of the next time interval 74, the method proceeds to step 114. The method then proceeds to step 116 to determine whether further time intervals 74 are to be performed in the subject routine. The method proceeds to step 118 where it is again determined whether any status signals 16 were received by the control module 18. If no status signals 16 were received the method returns to step 114 for a further iteration of the steps 114, 116 and 118.

Continuing with exemplary embodiment of the first heating routine in FIG. 4, and assuming that no status signals 16 are received from the one or more sensor devices 12, the control module 18 continues to communicate one or more control signals 22 to the heating and cooling devices 20 during the first through eight time intervals at steps 114, 116, and 118. The one or more control signals 22 instruct the heating and cooling devices to remain deactivated. On the ninth iteration 74 of steps 114, 116 and 118, the individual routine 72 communicates a further "or" control signal entry 76 instructing the control module 18 to communicate one or more control signals 22 for the activation of the heating and cooling devices 20. At the commencement of the tenth time interval 74, the control module 18 is the instructed to generates and communicate a further "off" control signal entry 76 which instructs the control module 18 to once again deactivate the heating and cooling devices 20. The heating and cooling devices 20 then remains deactivated for the next seven iterations of steps 116 and 118, as programmed in the remaining seven time intervals 74 of the H-O routine.

In use, each individual routine 72 will run continuously through each of the time intervals 74 (left to right in FIG. 4) for the pre-programmed or user defined time intervals 74 until the end of the routine 72 is reached or unless one or more status signals 16 are received from the one or more sensor devices 12. If, at step 118, one or more status signals 16 are communicated to the control module 18 requesting the activation of the heating and cooling devices 20, the method will activate the heating and cooling devices 20 at step 120, and then proceed to step 122. However, if the one or more status signals 16 communicated to the control module 18 correspond to the pre-programmed or user define control signal entries 76 in the routine 72 currently being generated and communicated by the control module 18, the method will return to step 114 to perform a further iteration of steps 114, 116 and 118, and the remaining time intervals 74 of the routine 72.

At the end of each individual heating or cooling routine 72, or when interrupted by on or more status signals 16 from the sensor devices 12, the control module 18 will proceed to step 124, where an analysis is performed to determine the current status of the control system 10.

At step 124, the control system 10 determines whether the one or more sensor devices 12 have communicated any status signals 22 to activate the heating and cooling devices 20 between a pre-defined minimum period and a pre-defined maximum period. The pre-defined minimum period may be equal to the total time interval 74 for each of the routines 72, such as, for example, sixteen minutes as illustrated in FIGS. 4 and 5. If the heating and cooling devices 20 have not been activated between the pre-defined minimum and maximum periods, the control module 18 will generate and communicate one or more control signals 22 at step 128 to activate the heating and cooling devices 20 and provide heating or cooling to the regulated area 14. If the most recent activation of the heating and cooling devices 20 at step 124 was to request heating in the regulated area 14, the control module 18 will communicate one or more control signals 22 at step 126 to activate the heating function of the heating and cooling devices 20. Similarly, if the most recent activation of the heating and coding devices at step 124 was to request cooling in the regulated area 14, the control module 18 will communicate one or more control signals 22 at step 126 to activate the cooling function of the heating and cooling devices 20.

Referring to FIGS. 4 and 5, a default routine 78 can be specified in each set of routines 70 for the heating and cooling functions of the heating and cooling devices 20, and are referenced as routines H-8 and C-8, respectively, in a preferred embodiment of the present invention, the control system 10 initiates and performs the appropriate default routine 78 at step 126 when the control system 10 is first connected and turned engaged. The default routine 78 at step 126 is also initiated and performed whenever the control system 10 determines at step 124 that the one or more sensor devices 12 have not communicated any status signals 16 requesting the activation of the heating and cooling devices 20 for a pre defined period.

If step 124, the one or more sensor devices 12 have communicated one or more status signals 22 to activate the heating and cooling devices 20 between the pre-defined minimum period and the pre-defined maximum period, the control system 10 at step 128 determines whether the actual time interval of the most recent activation of the heating and cooling devices corresponds to the pre-programmed or user defined time interval 74 of the control signal entry 76 in the subject routine 72.

If, at step 128, a discrepancy between the times is discovered and the actual duration of the activation of the heating and cooling devices 20 was greater than that instructed by the control module 18, the control system immediately initiates the next routine in the series of routines 70 at step 130. For example, if the last heating routine initiated and performed by the control system 10 was H-3 in FIG. 4, the control system 10 would then initiate heating routine H-4 at step 130. Similarly if the last cooling routine initiated and performed by the control system 10 was C-8 in FIG. 5, the control system 10 would then initiate cooling routine C-9 at step 130.

Conversely, if, at step 128, a discrepancy between the times is discovered and the actual duration of the activation of the heating and cooling devices 20 was less than that instructed by the control module 18, the control system 10 immediately initiates the previous routine in the series of routines 70 at step 130. For example, if the last heating routine initiated and performed by the control system 10 was H-3 in FIG. 4, the control system 10 would then initiate heating routine H-2 at step 130. Similarly, if the last cooling routine initiated and performed by the control system 10 was C-9 in FIG. 5, the control system 10 would then initiate cooling routine H-8 at step 130. If there is no discrepancy between the times, the control system immediately initiates and performs the same heating or cooling routine again at step 130.

While the method of the present invention has been primarily described with reference to the series of routines 70 for heating functions shown in FIG. 4, it should be understood that the identical steps in FIG. 6 may be performed in relation to the series of routines 70 for cooling functions in FIG. 5.

While the set of heating routines shown in FIG. 4 consist of sixteen individual routines corresponding to sixteen time intervals, it should be understood that any number of individual routines and time intervals may be utilized by the control system and method of the present invention. Moreover, it is to be understood that any number and combination of "on" and "off" control signals entries can be utilized in any given individual routine or set of routines.

While what has been shown and described herein constitutes a preferred embodiment of the subject invention, it should be understood that various modifications and adaptations of such embodiment can be made without departing from the present invention, the scope of which is defined in herein and in the appended claims.

As detailed in the Application Data Sheet fed concurrently herewith, this application is a continuation of and claims priority to co-pending U.S. patent application Ser. No. 11/655,235, filed Jan. 19, 2007, which in turn claims priority to U.S. Provisional Application Ser. No. 60/750,762, filed Jan. 19, 2006. The contents of both of these applications are incorporated herein by reference in their entirety.

That which is claimed:

1. A device for controlling heating or cooling calls from a thermostat to one or more heating or cooling devices, said device comprising:
a memory module adapted for storing a plurality of sequential routines, each routine comprising a plurality of sequential time intervals and a corresponding on or off state for each time interval, wherein a sum of the plurality of sequential time intervals for each routine comprises a total routine time interval; and
a control module
for determining which of the plurality of sequential routines to execute based on one or more of (i) whether a heating or cooling call received from the thermostat terminates before the total routine time interval lapses, (ii) whether a heating or cooling call from the thermostat continues uninterrupted for the total routine time interval, and (iii) whether no heating or cooling call is received from the thermostat for the total routine time interval.

2. The device of claim 1, wherein,
in response to receiving the heating or cooling call from the thermostat, the control module executes a designated current routine from a beginning point, the designated current routine comprising the determined sequential routine, wherein executing the designated current routine comprises (a) sending a heating or cooling activation signal to the one or more heating or cooling devices if a current time interval of the designated current routine comprises an on state or (b) not sending a heating or cooling activation signal to the one or more heating or cooling devices if the current time interval of the designated current routine comprises an off state.

3. The device of claim 2, wherein:
if the heating or cooling call received from the thermostat terminates before the total routine time interval lapses, the control module stops execution of the designated current routine and waiting for a subsequent heating or cooling call to be received from the thermostat before again executing the designated current routine from the beginning point;
if the heating or cooling call from the thermostat continues uninterrupted for the total routine time interval, the control module designates a different routine as the designated current routine and executing the newly designated current routine from a beginning point, the different routine being along the sequential routines in a first direction from the previously designated current routine; and
if no heating or cooling call is received from the thermostat continues for the total routine time interval, the control module designates a different routine as the designated current routine and executing the newly designated current routine from a beginning point, the different routine being along the sequential routines in a second direction from the previously designated current routine, the second direction being opposite the first direction.

4. The device of claim 1, wherein the total routine time intervals for each of the plurality of routines are equal.

5. The device of claim 3, wherein, if the heating or cooling call from the thermostat continues uninterrupted for the total routine time interval, the different routine being designated as the current routine is along the sequential routines in a first direction from the previously designated current routine and immediately adjacent the previously designated current routine.

6. The device of claim 3, wherein, if no heating or cooling call is received from the thermostat continues for the total routine time interval, the different routine being designated as the current routine is along the sequential routines in a second direction from the previously designated current routine and immediately adjacent the previously designated current routine.

7. The device of claim 1, wherein, if no heating or cooling call is received from the thermostat for a predefined extended time period, then any subsequent heating or cooling calls will be allowed to pass unimpeded to the one or more heating or cooling devices until a preset temperature is reached.

8. The device of claim 1, further comprising a bypass switch, and wherein:
the control module receives a bypass signal from the bypass switch;
the control module captures data regarding on and off states of the one or more heating and cooling devices as if a designated current routine were executing from a beginning point, the designated current routine comprising the determined sequential routine, wherein executing the designated current routine comprises (a) sending a heating or cooling activation signal to the one or more heating or cooling devices if a current time interval of the designated current routine comprises an on state or (b) not sending a heating or cooling activation signal to the one or more heating or cooling devices if the current time interval of the designated current routine comprises an off state; and the control module allows the heating or cooling call to be communicated directly from the thermostat to the one or more heating or cooling devices.

* * * * *